Figure 1:
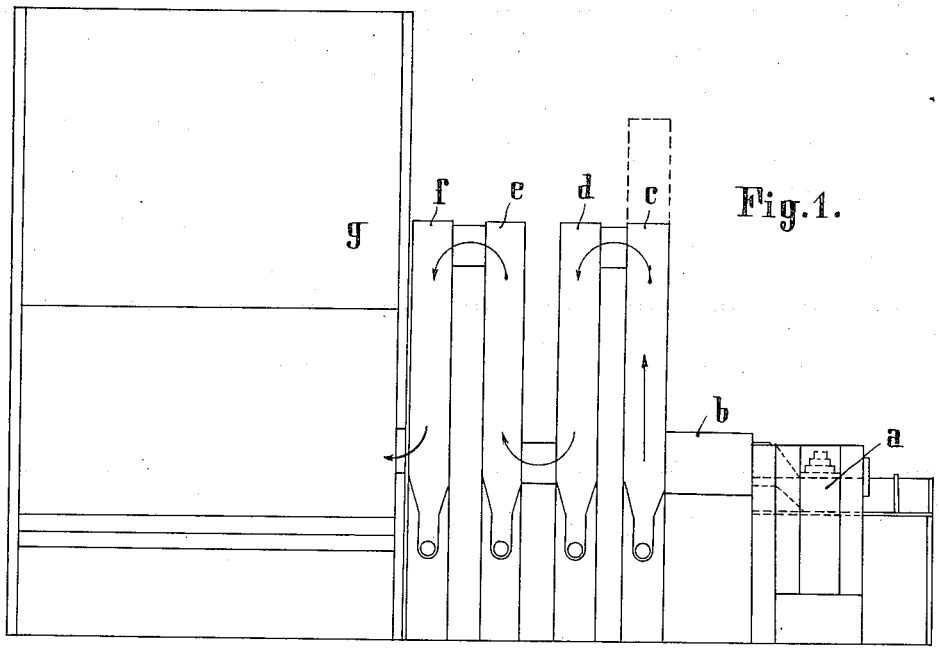

J. B. HANNAY.
PROCESS FOR SEPARATING THALLIUM AND RADIOACTIVE METALS FROM LEAD ORES AND PRODUCING A WHITE LEAD PIGMENT.
APPLICATION FILED JULY 30, 1913. RENEWED DEC. 31, 1915.

1,175,146.

Patented Mar. 14, 1916.
6 SHEETS—SHEET 1.

J. B. HANNAY.
PROCESS FOR SEPARATING THALLIUM AND RADIOACTIVE METALS FROM LEAD ORES AND PRODUCING A WHITE LEAD PIGMENT.
APPLICATION FILED JULY 30, 1913. RENEWED DEC. 31, 1915.

1,175,146.  Patented Mar. 14, 1916.
6 SHEETS—SHEET 5.

Witnesses:
John Murtagh
F. Hogg

Inventor:
James Ballantyne Hannay
BY Carl P. Goepel
ATTORNEY

J. B. HANNAY.
PROCESS FOR SEPARATING THALLIUM AND RADIOACTIVE METALS FROM LEAD ORES AND PRODUCING A WHITE LEAD PIGMENT.
APPLICATION FILED JULY 30, 1913. RENEWED DEC. 31, 1915.
1,175,146.
Patented Mar. 14, 1916.
6 SHEETS—SHEET 6.
Fig.6.
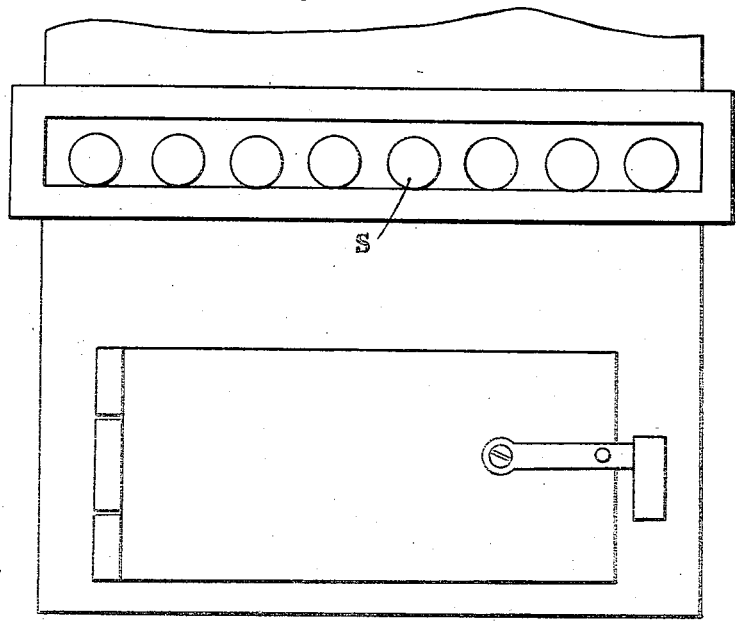
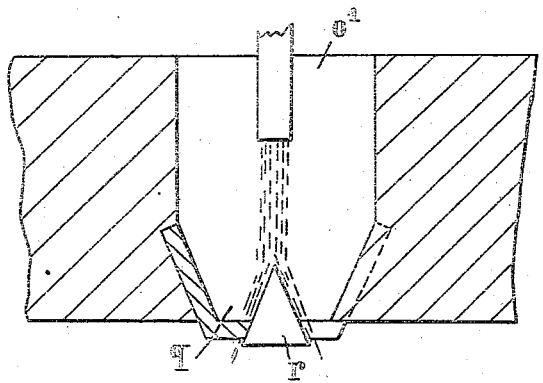
Fig.7.
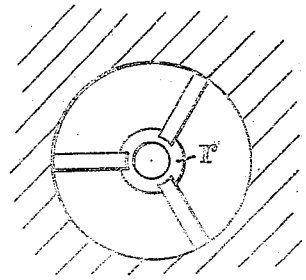

UNITED STATES PATENT OFFICE.

JAMES BALLANTYNE HANNAY, OF HAMBURG, GERMANY, ASSIGNOR TO DEUTSCHE FELSEN-OEL-GESELLSCHAFT FRANZEN U. CO., OF BERLIN, GERMANY, A FIRM.

PROCESS FOR SEPARATING THALLIUM AND RADIOACTIVE METALS FROM LEAD ORES AND PRODUCING A WHITE LEAD PIGMENT.

1,175,146.  Specification of Letters Patent.  Patented Mar. 14, 1916.

Application filed July 30, 1913, Serial No. 782,132. Renewed December 31, 1915. Serial No. 69,706.

*To all whom it may concern:*

Be it known that I, JAMES BALLANTYNE HANNAY, technical chemist, and a subject of the King of England, residing at Hamburg, in the German Empire, have invented certain new and useful Improvements in Processes for Separating Thallium and Radioactive Metals from Lead Ores and Producing a White Lead Pigment, of which the following is a specification.

The invention relates to the separation from lead ores of thallium and the rare metals particularly the radio-active metals and to the production of a white sulfate of lead pigment.

I have found that if lead ore, for example, galena, is rapidly vaporized in a current of hot reducing gases such as carbonic oxid and nitrogen, and the vapor is fired by the addition of a large excess of air as near as possible to the outlet from the furnace, the quantity of air being sufficient to obtain complete oxidation in a short space, and if the fumes be allowed to cool comparatively slowly, the salts of thallium and the rare metals, especially those of the radio-active group, form a mixture with the lead sulfate having a lower melting point, and consequently remain longer in the liquid state than lead sulfate, and tend to coalesce into large drops and fall into the earliest chambers, while the lead sulfate is carried farther by the flame and is deposited farther from the furnace. Further, the composition of the lead sulfate is improved, being nearer the composition $3PbSO_4.PbO$, so that a better white is obtained.

The invention consists in a process for separating thallium and the rare metals from lead ore by volatilizing the ore on a deep bed of coke in a furnace, the temperature being sufficient to boil off the lead sulfid, and in adding a large excess of air immediately outside the furnace, completely oxidizing the vapor, and passing the oxidized fumes through suitably placed separating vessels where cooling takes place gradually, so that the constituents of the fume are selectively deposited. Fresh coke and ore are continuously fed into the apparatus by suitable means, so that the thermal conditions in the furnace are continuously maintained and it is not necessary to open the furnace. The volatilization of the deposited fumes may be repeated in order to obtain a further concentration of thallium and the rare metals, the process being repeated as often as desirable.

The following description and drawings show a preferred embodiment of my invention.

Figure 2:
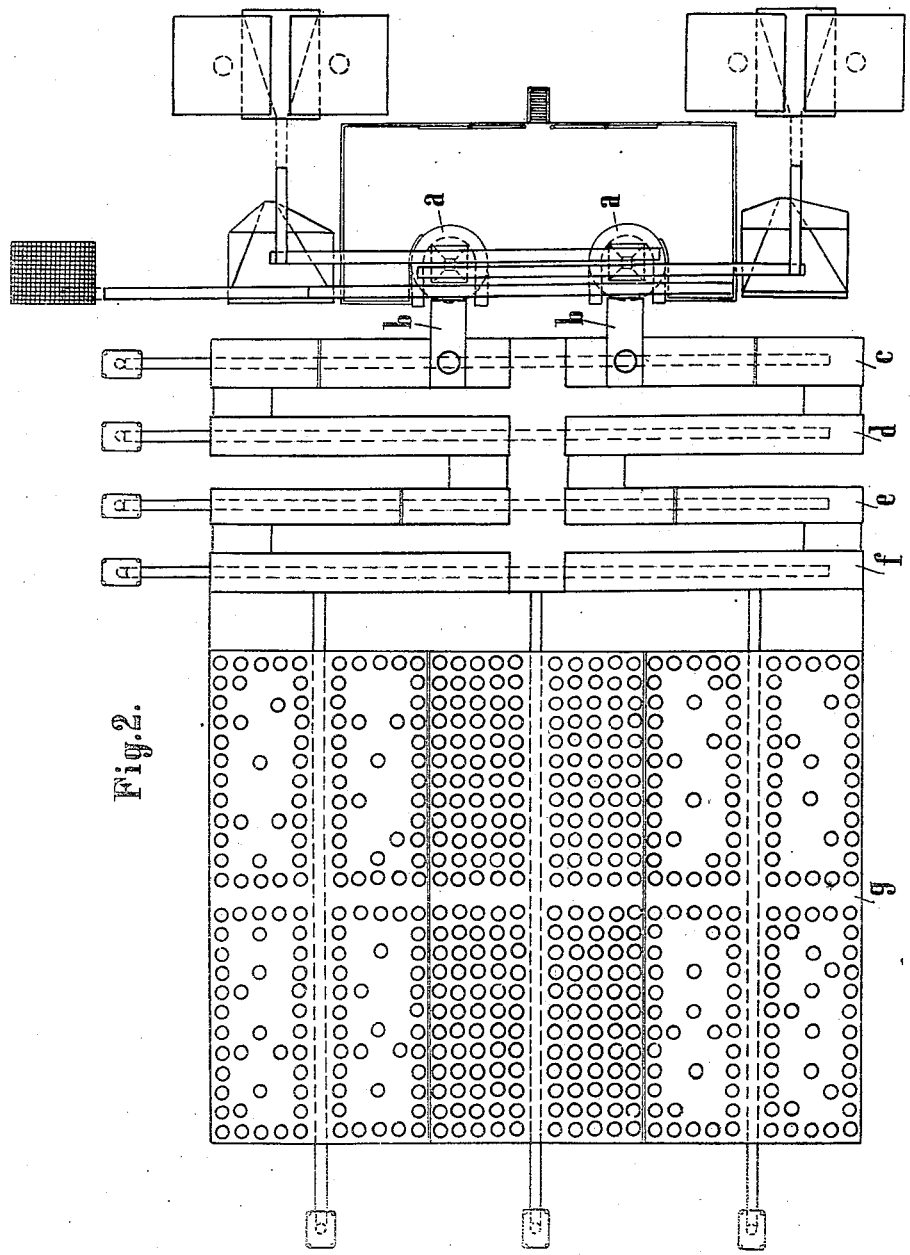
Figure 3:
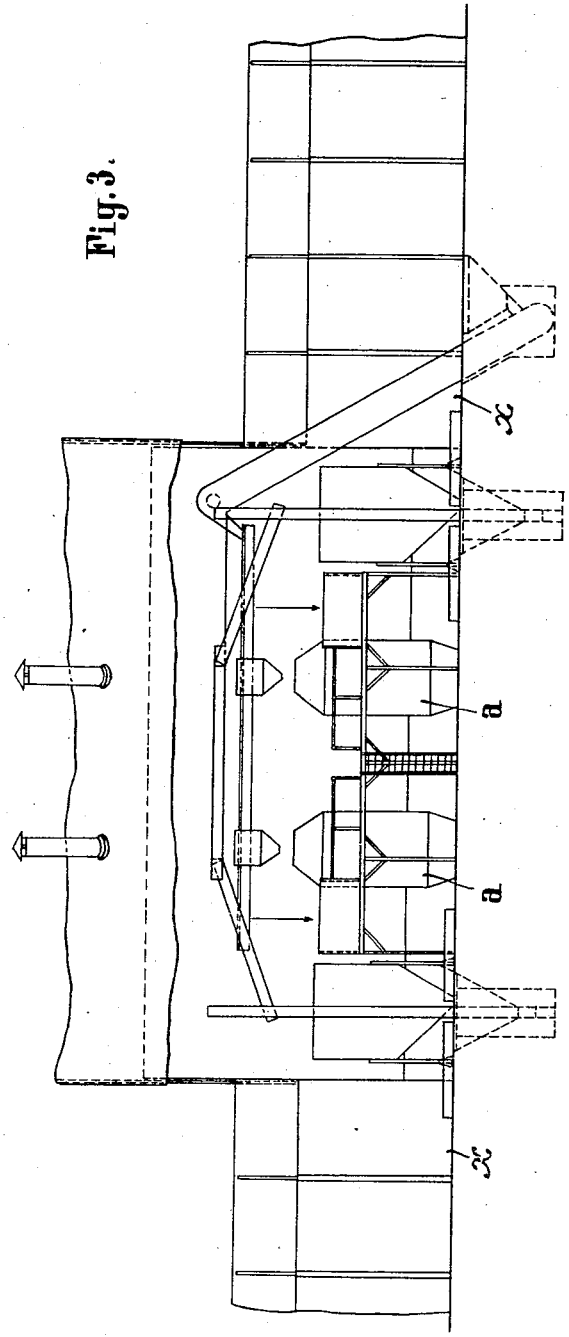
Figure 4:
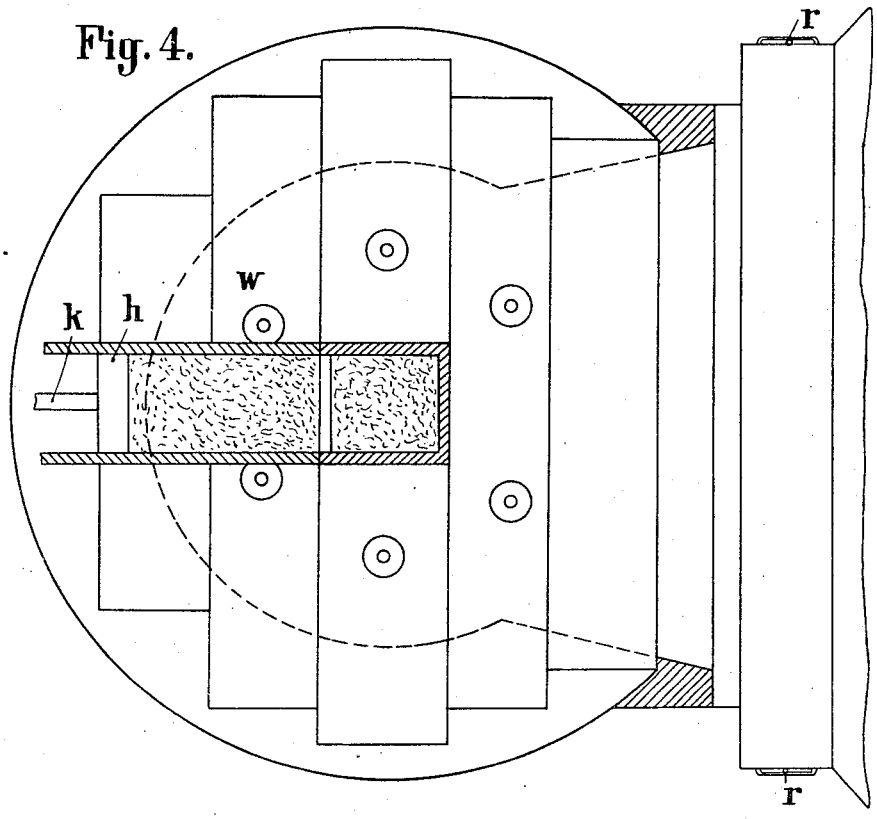
Figure 5:
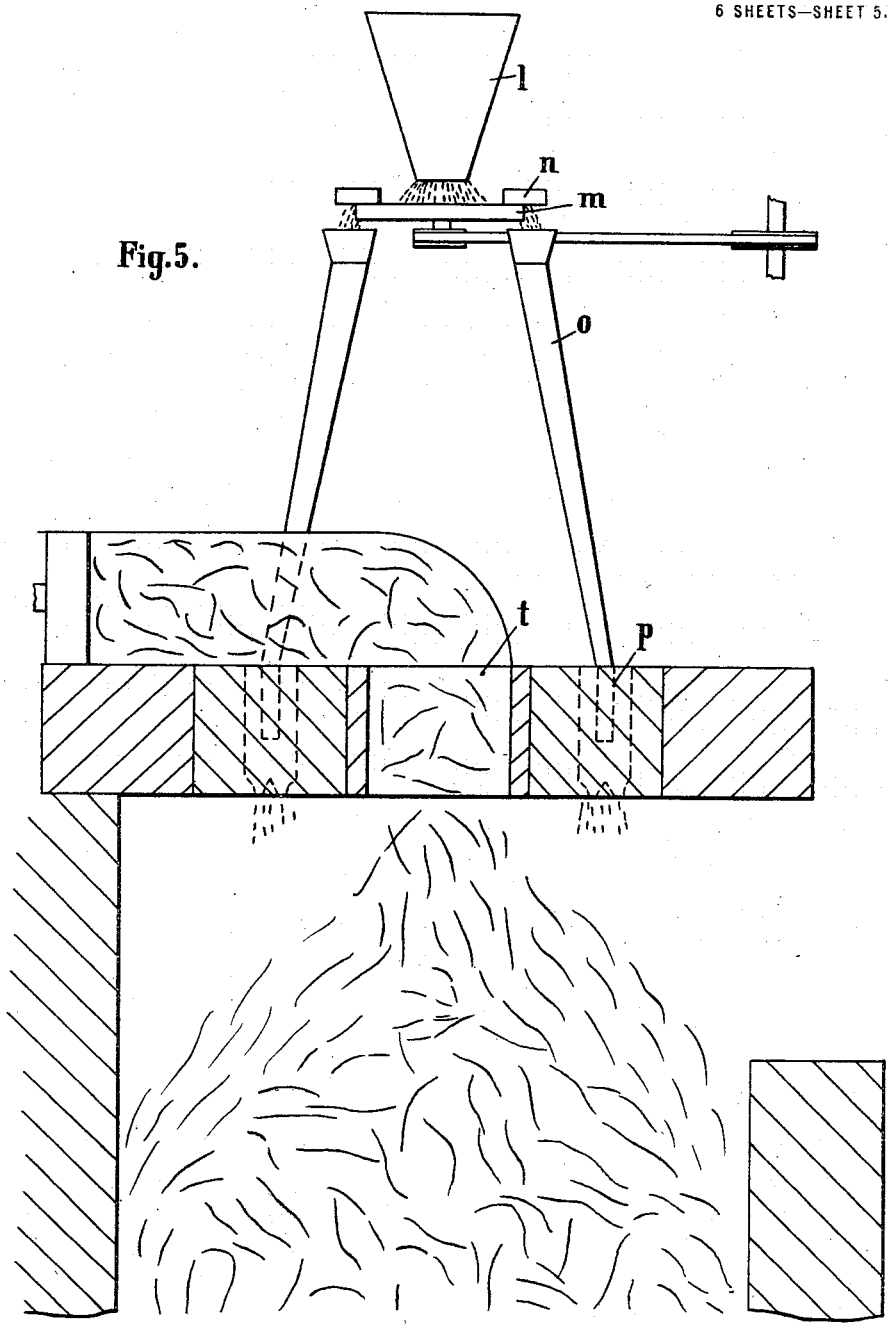

Figure 1 is a longitudinal elevation showing the complete plant; Fig. 2 is a plan of the same; Fig. 3 is an end elevation; Fig. 4 a sectional plan of the furnace; Fig. 5 a vertical section of the top of the furnace; Fig. 6 a side elevation of the lower part of the furnace; Fig. 7 two sections showing one of the ore-feeding devices.

In carrying the invention into effect with the apparatus illustrated, galena in the form of powder is fed on to the top of a deep layer of coke in two adjacent furnaces $a\ a$, as shown in Fig. 2, and the volatilized vapor is passed directly from each furnace into a combustion chamber $b$ connected with and in close proximity to the furnace. At the entrance to this chamber a large excess of air is introduced through jets so that it strikes the vapor immediately this issues from the furnace. The air may flow in at the top and at the sides through the apertures $x$, the inflow in such case being caused by the reduced pressure in the apparatus produced by a fan at the outlet from the condensing chamber, but preferably, nozzles and a blower may be provided so as to get a sharp blast of air forced into the middle of the fumes issuing from the furnace; a short and fierce flame is thus produced. Sufficient air is added to oxidize the whole of the vapor completely and as rapidly as possible; preferably 8 to 10 times the theoretical quantity of air is supplied. Combustion then occurs, and the fumes are passed in succession through a number of cooling chambers $c\ d\ e\ f$ and finally to vessels $g$ in which the remaining sulfate of lead is deposited. The thallium and rare metals are for the most part deposited in the first cooling chamber $c$ immediately after the combustion takes place. The coke is fed into the furnace through a side passage at the top of the furnace by means of a pusher $h$ moved forward by a screw $k$, as shown in Fig. 4, or by like means. The ore to be treated, in the form of powder, is contained in a hopper $l$ above the furnace, and is fed on to a rotating plate m, from which it is pushed by scraper knives n into the pipe o leading to the distributing apertures o'. The distributing devices consist of funnels q in the apertures o carrying in a central position conical pieces r, and the ore falling on these conical pieces is separated out and falls in a conical shower on to the top of the coke. A blast of air is introduced at the bottom of the furnace, and solid firebars s are used at some distance apart, an air-tight door being provided opposite the ends of the bars, so that the removal of clinker can be effected by the introduction of a long chisel parallel to the bars. The whole of the bottom of the furnace is kept air-tight and during the whole of the furnacing operation it is unnecessary to open the furnace for any purpose. The bars are such a distance apart that the coke automatically falls through, carrying with it the clinker formed. In the form of furnace illustrated 6 apertures are provided, at each of which ore is fed in, the coke being fed in centrally at the point t.

It is found that by reason of the separation of the thallium and the rare metals, the resulting white sulfate of lead is of a better color.

By reason of the increased temperature and the boiling off of the galena as apart from slow volatilization, it is rendered possible to obtain in a furnace of a given size a yield of about 10 times the amount produced by former processes, while at the same time the color of the sulfate is improved and the thallium and rare metals are separated.

It is of importance in this process that the vapor should be completely oxidized, as otherwise less oxidized salts of lead are produced which have a low melting point and will be deposited with the rare metals in the earlier cooling chambers. On the other hand, if too long a flame is used basicity is so increased that a colored mixture containing litharge of low melting point may be produced interfering with the separation of the rare metals. It is also important that the cooling should be comparatively slow to obtain the best result, and water-cooling should in all cases be avoided. After the first separation the deposited metals are again volatized under similar conditions in a second furnace, and, if desired, in a third, so that further concentrations of thallium and the rare metals are obtained. In the further concentration the lead is converted to pig lead, and after several concentrations a dark brown mixture of salts of thallium and the rare metals is obtained.

I find it of importance, in order to obtain satisfactory results to treat lead ore only, and not mixed ores, as in the case of mixed ores containing also antimony or copper, troublesome slags are formed. With lead ores, however, there is practically no residue in the first furnace, and only metallic lead is formed in the second and later furnaces.

I claim:

1. A process for separating thallium and radioactive metals from lead ores and producing a white lead pigment by volatilizing the ore in the presence of hot reducing gases, adding a large excess of air immediately outside the region of heat, completely oxidizing the vapor, and gradually cooling the oxidized fumes while moving them along a defined path, so that the constituents of the fume are selectively deposited along said defined path.

2. A process for separating thallium and radioactive metals from lead ores and producing a white lead pigment by volatilizing the ore in the presence of hot reducing gases, and in the absence of oxygen, adding a large excess of air immediately outside the region of heating, completely oxidizing the vapor and gradually cooling the oxidized fumes while moving them along a defined path, so that the constituents of the fume are selectively deposited along said defined path.

3. A process for separating thallium and radioactive metals from lead ores and producing a white lead pigment by volatilizing the ore in the presence of hot reducing gases, and in the absence of oxygen, adding a large excess of air immediately outside the region of heating, completely oxidizing the vapor and gradually cooling the oxidized fumes while moving them along a defined path, so that the constituents of the fume are selectively deposited, collecting the deposits containing the thallium and the radioactive metals and subjecting them again to the same operations in order to concentrate the thallium and the radioactive metals.

In testimony whereof I have affixed my signature in presence of two witnesses.

JAMES BALLANTYNE HANNAY.

Witnesses:
ERNEST H. L. MUMMENHOFF,
IDA CHRIST. HAFERMANN.